US010875469B2

(12) United States Patent
Mleczko et al.

(10) Patent No.: US 10,875,469 B2
(45) Date of Patent: Dec. 29, 2020

(54) VEHICLE CAMERA HOUSING WITH TOLERANCE COMPENSATING CONTACTS

(71) Applicant: MAGNA ELECTRONICS INC., Auburn Hills, MI (US)

(72) Inventors: Jamie A. Mleczko, Washington, MI (US); Jonathan D. Conger, Berkley, MI (US); Steven V. Byrne, Goodrich, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 1402 days.

(21) Appl. No.: 14/665,065

(22) Filed: Mar. 23, 2015

(65) Prior Publication Data

US 2015/0266430 A1 Sep. 24, 2015

Related U.S. Application Data

(60) Provisional application No. 61/969,474, filed on Mar. 24, 2014.

(51) Int. Cl.
*B60R 11/04* (2006.01)
*H04N 5/225* (2006.01)

(52) U.S. Cl.
CPC .......... *B60R 11/04* (2013.01); *H04N 5/2252* (2013.01); *H04N 5/2257* (2013.01); *B60R 2300/40* (2013.01)

(58) Field of Classification Search
USPC ........................................................ 348/148
See application file for complete search history.

(56) References Cited

U.S. PATENT DOCUMENTS

| 5,550,677 | A | 8/1996 | Schofield et al. |
| 5,670,935 | A | 9/1997 | Schofield et al. |
| 5,949,331 | A | 9/1999 | Schofield et al. |
| 7,965,336 | B2 | 6/2011 | Bingle et al. |
| 8,503,061 | B2 | 8/2013 | Uken et al. |
| 8,542,451 | B2 | 9/2013 | Lu et al. |
| 8,866,907 | B2 | 10/2014 | McElroy et al. |
| 9,233,641 | B2 | 1/2016 | Sesti et al. |

(Continued)

FOREIGN PATENT DOCUMENTS

WO   WO 2013065961 A1 *   5/2013   ........... H04N 5/2257

*Primary Examiner* — Christopher S Kelley
*Assistant Examiner* — Ana Picon-Feliciano
(74) *Attorney, Agent, or Firm* — Honigman LLP (57) ABSTRACT

A camera assembly for a vehicle vision system includes a housing with a lens holder at a first housing portion and a connector portion at a second housing portion. The connector portion is configured for connecting to vehicle wiring when the camera assembly is installed at a vehicle. A circuit element is disposed within the housing and a plurality of electrical connector elements is disposed at the connector portion of the second housing portion. Each of the electrical connector elements includes a first end portion configured for electrically connecting to circuitry of the circuit element and a second end portion configured for electrically connecting to the vehicle wiring. The first end portions of the electrical connector elements include flexible elements that, during mating of the first housing portion to the second housing portion, flex as the first end portions engage the circuitry and make electrical connection with the circuitry.

19 Claims, 5 Drawing Sheets

(56) References Cited

U.S. PATENT DOCUMENTS

| | | |
|---|---|---|
| 9,609,757 B2 | 3/2017 | Steigerwald |
| 2006/0171704 A1* | 8/2006 | Bingle .................... B60R 11/04 396/419 |
| 2011/0310248 A1 | 12/2011 | McElroy et al. |
| 2013/0222595 A1 | 8/2013 | Gebauer et al. |
| 2013/0242099 A1 | 9/2013 | Sauer et al. |
| 2013/0328672 A1 | 12/2013 | Sesti et al. |
| 2013/0344736 A1 | 12/2013 | Latunski |
| 2014/0138140 A1 | 5/2014 | Sigle |
| 2014/0176717 A1* | 6/2014 | De Paschoal .......... B60R 11/04 348/148 |
| 2014/0320636 A1 | 10/2014 | Bally et al. |
| 2014/0362209 A1 | 12/2014 | Ziegenspeck et al. |
| 2014/0373345 A1 | 12/2014 | Steigerwald |
| 2015/0222795 A1 | 8/2015 | Sauer et al. |
| 2015/0266430 A1 | 9/2015 | Mleczko et al. |
| 2015/0365569 A1 | 12/2015 | Mai et al. |
| 2016/0037028 A1 | 2/2016 | Biemer |
| 2016/0268716 A1 | 9/2016 | Conger et al. |
| 2017/0133811 A1 | 5/2017 | Conger et al. |

\* cited by examiner

VEHICLE CAMERA HOUSING WITH TOLERANCE COMPENSATING CONTACTS

CROSS REFERENCE TO RELATED APPLICATION

The present application is related to U.S. provisional application Ser. No. 61/969,474, filed Mar. 24, 2014, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a camera for a vehicle vision system, with the camera providing enhanced electrical connection between terminals of a connector of the camera (that are electrically connected to a vehicle wiring or lead when the camera is mounted at a vehicle) and circuitry of a circuit element (such as a printed circuit board (PCB) or the like) within the housing of the camera.

According to an aspect of the present invention, a camera for a vehicle vision system includes a housing (which may comprise a first housing portion and a second housing portion, with the first housing portion having a lens holder for holding a lens thereat) having a connector portion for connecting to a vehicle wiring when the camera is installed at a vehicle (the connector portion may be part of the second housing portion). A circuit element (such as a printed circuit board or the like) is disposed within the housing, and a plurality of electrical connector elements are disposed at the connector portion of the housing. The electrical connector elements includes first ends that are configured for electrically connecting to circuitry of the circuit element and second ends that are configured for electrically connecting to the vehicle wiring. The first ends comprise springs that flex as they engage the circuitry of the circuit element as the camera housing is assembled. The electrical connector elements thus self-adjust to engage the circuitry and maintain engagement with the circuitry during assembly of the camera housing and during use of the camera on a vehicle.

Therefore, the present invention provides a vehicle vision system camera that has enhanced electrical connection between an electrical wiring or lead of the vehicle that connects to terminals or pins of a camera connector and to circuitry of an imager PCB or the like. The enhanced electrical connection is provided via an adjustable or self-adjusting or self-compensating electrical connector, such as a spring element or spring-loaded pin or connector or a flexible or resilient connector, with the connector elements self-adjusting or moving or flexing or compressing to maintain alignment and electrical connection between the connector portion of the camera housing and the circuitry of the imager PCB or other circuitry within the camera housing. The present invention thus enhances the manufacturing of the camera module (and assembling of the first and second housing portions together), such as by readily adjusting or adapting for tolerance variations and misalignments or slight misalignments of the housing portions and camera components, and provides enhanced electrical connection over the life time of the camera.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
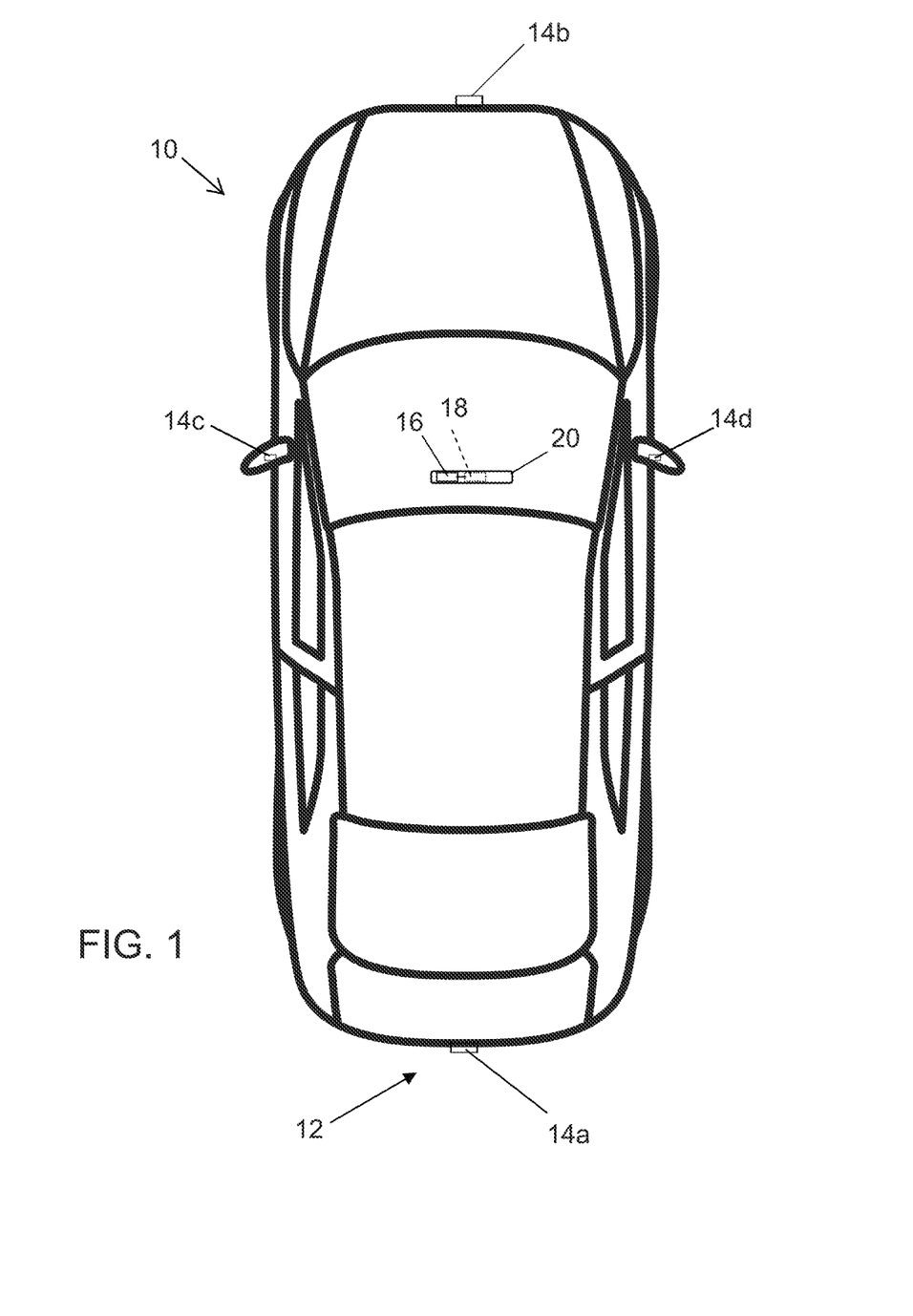
FIG. 1 is a plan view of a vehicle with a vision system that incorporates at least one camera in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The camera module and/or connectors may utilize aspects of the camera connectors described in U.S. patent application Ser. No. 14/609,650, filed Jan. 30, 2015, now U.S. Pat. No. 10,298,823, and/or Ser. No. 13/785,099, filed Mar. 5, 2013, now U.S. Pat. No. 9,565,342, and/or International Publication No. WO 2010/091347, which are all hereby incorporated herein by reference in their entireties.

From International Publication No. WO 2010/091347, incorporated above, a "floating" rear cover may be fixated and the connector pins are inserted. Also, and as described in WO 2010/091347, elastic pins may be disposed between the PCB and the housing for coping with forces due to misaligning of the assembly. As described in U.S. patent application Ser. No. 13/785,099, incorporated above, telescoping pins may be provided for coping with the misalignment of PCBs to the imager PCB of cameras with more than one PCB, such as by elastic/flexible pins, telescopic pins or with flexible wiring inside the camera for connecting camera coaxial connectors mounted at the camera body to a camera PCB.

Figure 2:
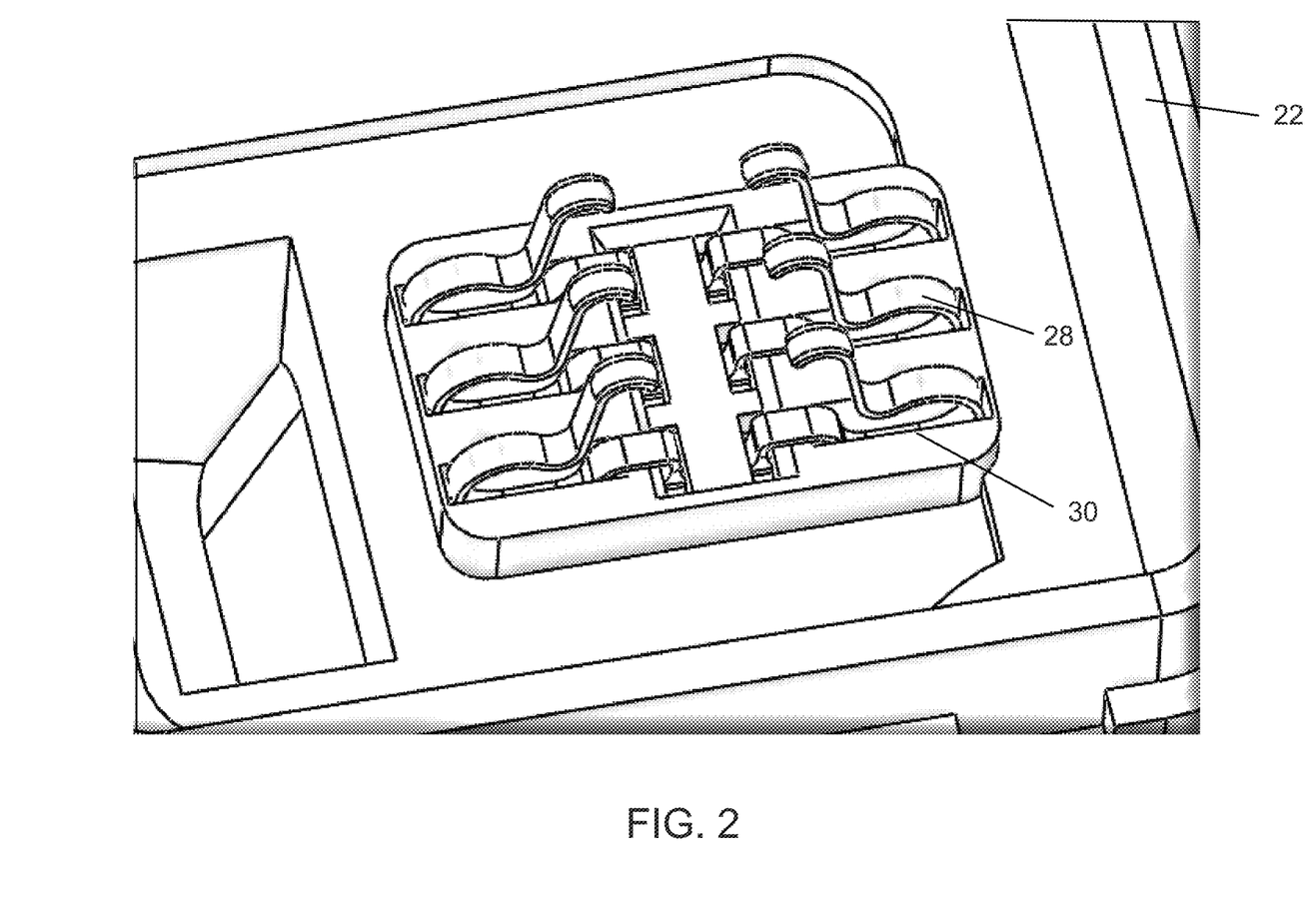
FIG. 2 is a perspective view of a six element connector of the present invention, with six individual springs that are configured to engage circuitry at a circuit element of a camera housing as the camera housing is assembled.
Figure 3:
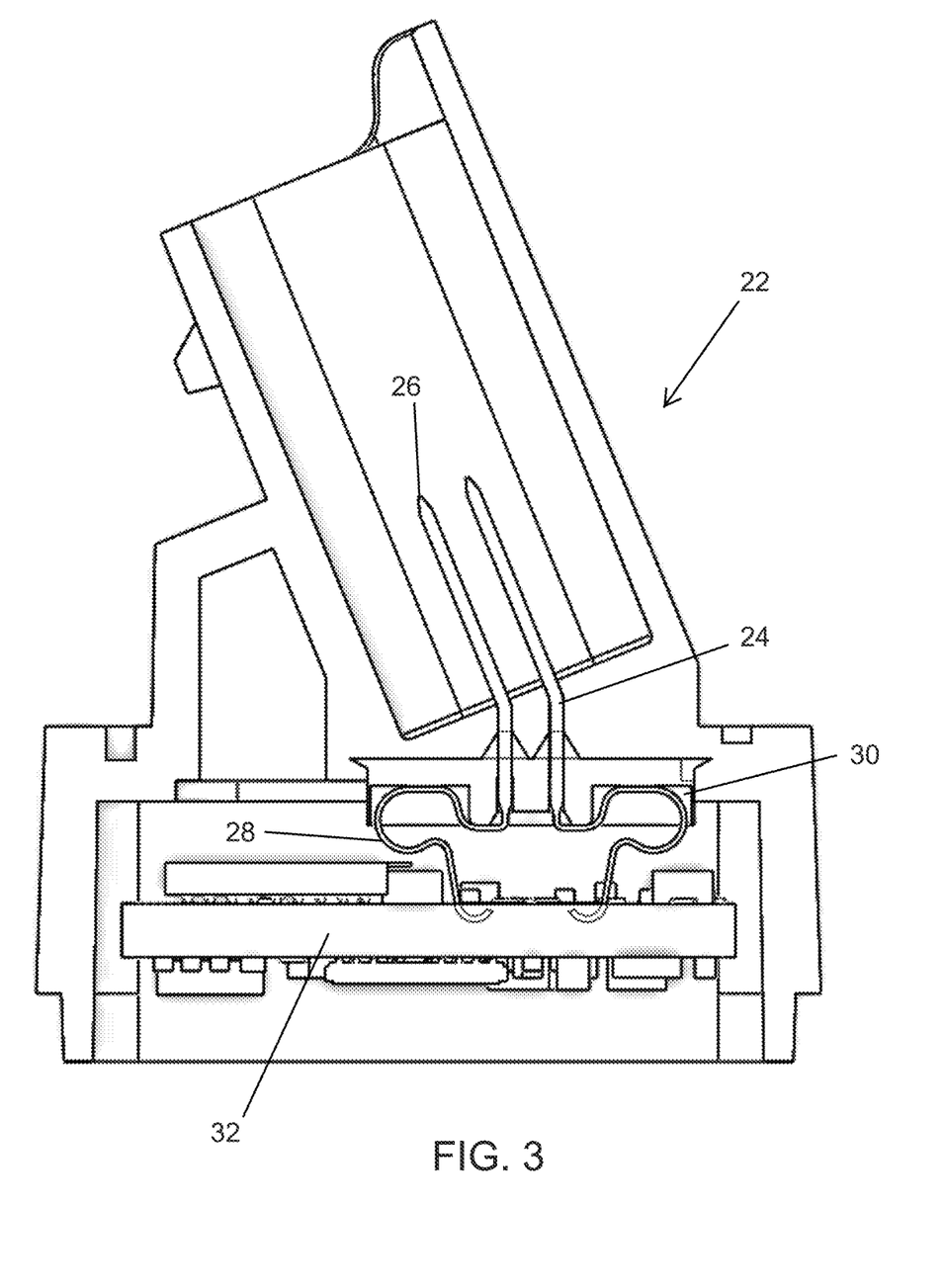
FIG. 3 is a side sectional view of the camera assembly, with the spring elements of the connector engaging the circuitry of the circuit element within the camera housing in accordance with the present invention.
Figure 4:
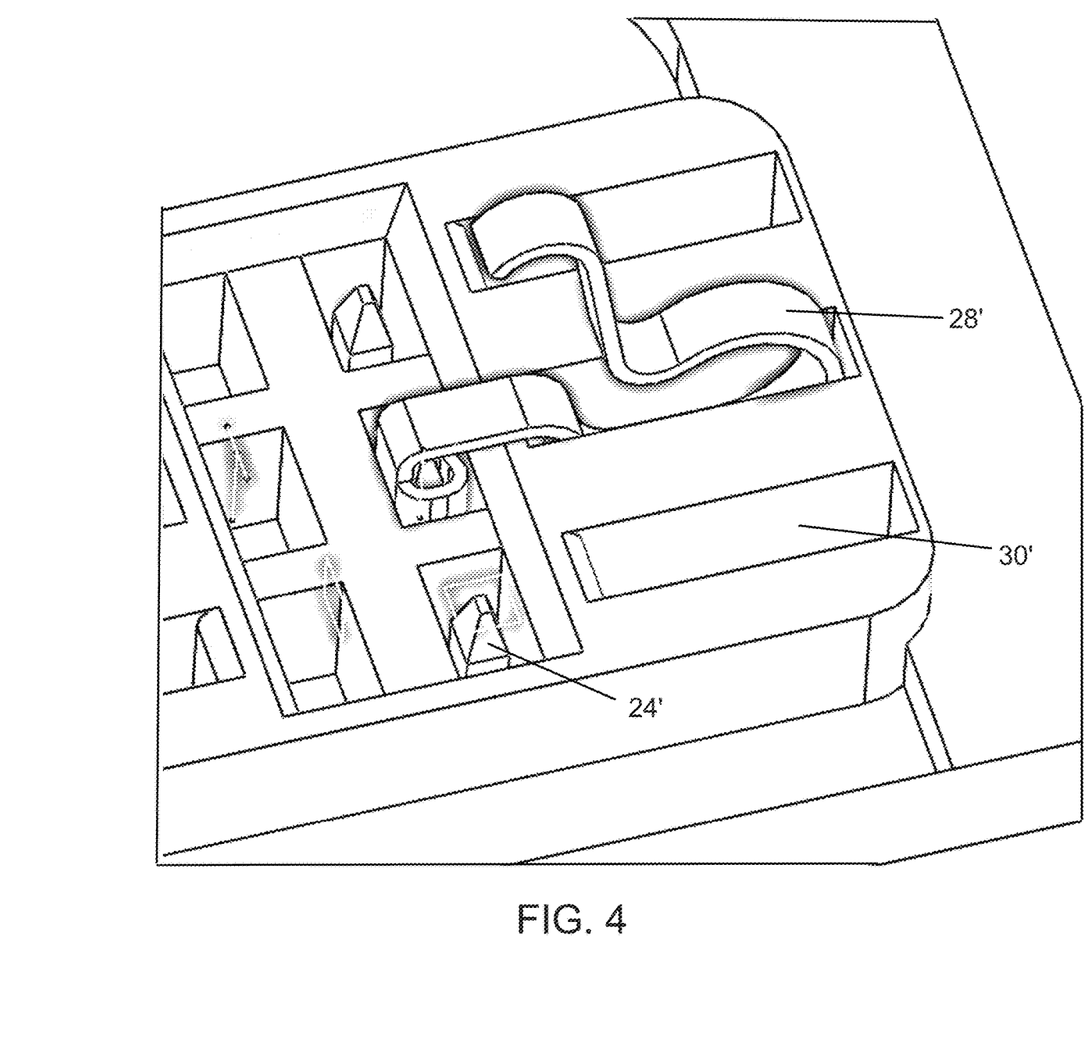
FIG. 4 is an enlarged perspective view showing a single individual connector of the present invention, as disposed at the connector base.

Referring now to FIGS. 2-4, a camera housing 22 is formed with integrated tolerance compensating terminals 24. This allows for compliance in the electrical connection between the outboard terminals of the electrical connector portion of the camera and the printed circuit board 32 disposed within the camera housing. The terminals may be insert molded or pressed into the housing, or may be disposed at or in a molded carrier sub-assembly. The outboard pattern or portion 26 of the terminals is designed to match a typical automotive harness connector (such as a multi-pin connector of a plug and socket connection). The inboard shape or portion 28 of the terminals have a tolerance compensating feature (spring) to ensure contact with circuitry or pads on a printed circuit board regardless of the position of the PCB relative to the camera housing and connectors.

The inboard spring elements or flexible elements 28 of the terminals are biased towards an extended state and flex or compress towards a flexed or compressed state during assembly of the camera housing portions together (such as during mating of the front or lens holder housing portion with the rear or connector housing portion). When the spring elements are compressed during assembly of the camera housing portions, the spring elements exert a biasing force at the circuitry to ensure robust electrical connection at the circuitry. The biasing force or spring rate of the spring elements is optimized to minimize force on the PCB while maximizing resistance to vibration.

Figure 5:
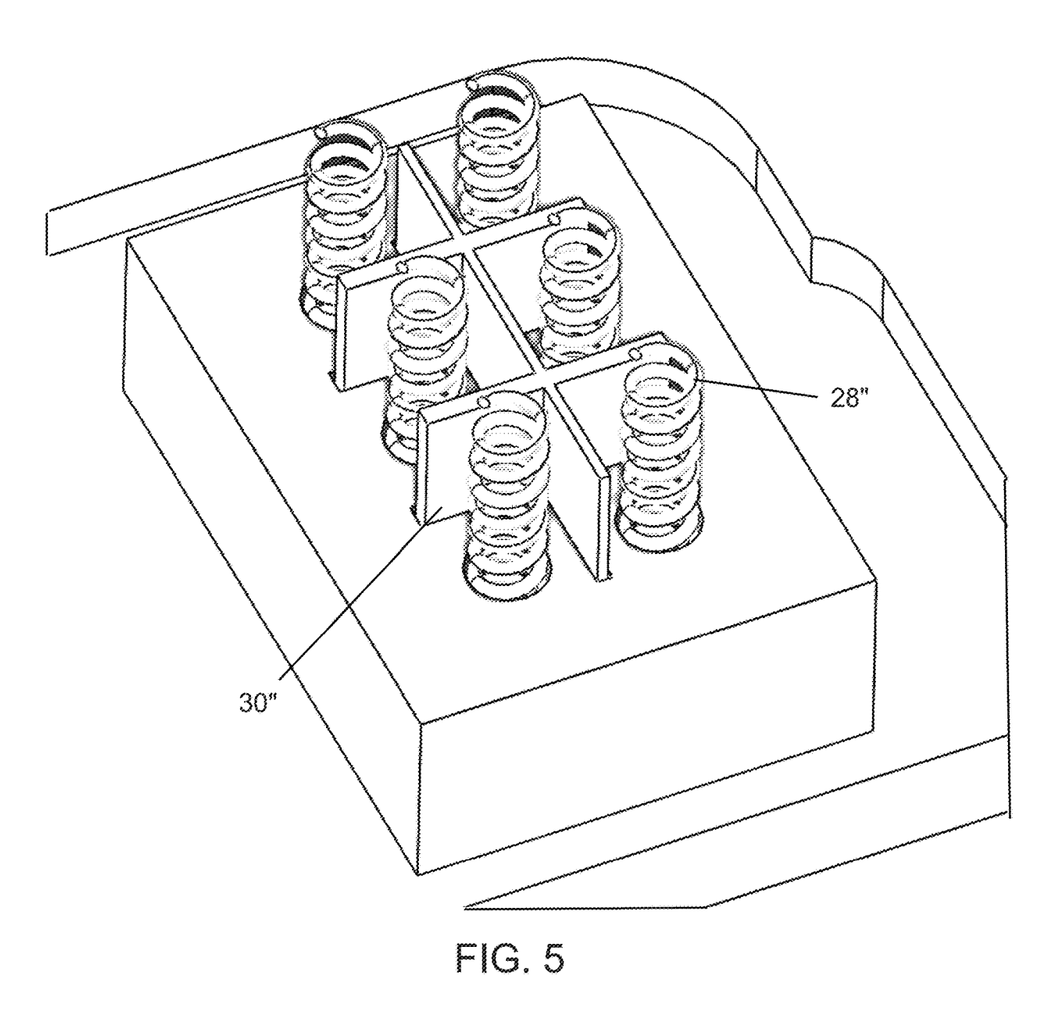
FIG. 5 is a perspective view of another six element connector of the present invention, with six individual springs that are configured to engage circuitry at a circuit element of a camera housing as the camera housing is assembled.

The electrical connector of the present invention provides terminals or pins at the connector for electrically connecting to a vehicle wiring harness, and provides flexible spring-like connectors or elements that flex as they connect to the circuitry of the circuit element or board of the camera housing. The flexible spring-like connectors or elements may connect to the terminals or pins or body portions of the electrical connectors via any suitable means. For example, and as shown in FIGS. 2 and 3, each terminal and spring feature comprises a unitary construction. Optionally, and as shown in FIG. 4, the terminal body 24' and spring element 28' are separate elements that contact/mate in some fashion (such as crimping or interference fit or the like) to pass an electrical signal from one to the other. Optionally, and as shown in FIG. 5, the spring feature or element 28" may comprise a coil spring configuration that may flex axially (and laterally) to connect to the terminals of the connector portion and that provides tolerance compensation in accordance with the present invention. The outboard end of the spring element may connect to the terminal body portion of the connector via any suitable means, such as crimping or interference fit or such as the spring being sized to receive the terminal body portion within the spring in an interference fit manner or such as via integrally forming the spring element with the terminal body portion.

As shown in FIGS. 2, 4 and 5, the spring elements or flexible elements 28, 28', 28" may be disposed at least partially in electrically isolated chambers or receiving portions 30, 30', 30" of the housing (or of a separate plastic or polymeric element disposed at an inboard portion of the rear or connector housing portion), in order to electrically isolate the elements from one another to limit or substantially preclude contact between the elements (and electrically shorting between the elements) during assembly of the camera module. The isolated chambers provide sufficient clearance to allow for flexing or compressing of the spring elements during assembly of the camera housing, while guiding the elements in a manner that limits or precludes bending in a non-designed manner and contacting other elements of the connector. The chambers may be molded as part of the housing portion (such as via injection molding of the housing portion) or the chambers may be molded into a separate element attached at the inboard portion of the rear or connector housing portion).

The spring feature may be formed by any of the following methods, and other similar methods not described here:

1) The terminal material thickness is reduced and formed into a spring shape.

2) The spring is formed as a separate piece and crimped to the terminal or pressed to the terminal with an interference fit (as can be seen with reference to FIG. 3), or may be joined by welding, soldering, or brazing. The spring and terminals may comprise different materials, selected and optimized for their unique functions and for the particular application of the connector and camera.

3) The springs are inserted into a molded housing with separate chambers for each spring to prevent cross-contact. The inboard terminal tips are bent such that they are approximately parallel with the PCB such that the spring can axially bridge between the terminals and contact the PCB as the camera housing is assembled.

The shape of the camera housing or carrier is designed such that it ensures the orientation of the spring itself. The housing or carrier may also contain a trough for adhesives, potting, or secondary material whose function is to provide rigidity to the spring position, as well as provide sealing for the camera housing against water intrusion.

A benefit and/or advantage of the contact design and construction of the present invention over other known connectors is that the present invention allows for a reduced PCB size, thereby allowing for a smaller camera.

Thus, the present invention provides a camera that has a housing comprising first and second plastic or polymeric portions that are mated together and joined (such as via adhesive or welding or sonic welding or the like) to substantially seal the circuit board and circuitry within the housing. The first portion of the housing includes a lens holder or lens barrel that houses and/or supports the lens (such as one or more optical elements of the lens), while the second housing portion (FIG. 3) includes the connector portion. The connector portion may extend from the housing and the plane of the circuit element or board at an angle (as shown in FIG. 3) or may be generally normal to the circuit element plane, depending on the particular application of the camera at the vehicle. The second housing portion may receive the circuit board and circuitry (including the imager established thereat) and may be configured to mate with the first housing portion, whereby the circuit board is secured in the housing when the housing portions are mated together, with the lens aligned with the imager at the circuit board. As the housing portions are mated together, the flexible spring-loaded connecting elements engage the circuitry of the circuit element (which may be attached at the first housing portion and thus brought into engagement with the connecting elements as the housing portions are mated together) to electrically connect the terminals of the connector portion with the circuitry, whereby the camera, when assembled, may be readily electrically connected to a vehicle wiring harness or the like when the assembled camera is installed at a vehicle.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. patent application Ser. No. 13/202,005, filed Aug. 17, 2011, now U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2010/099416; WO 2011/028686 and/or WO 2013/016409, and/or U.S. Pat. Publication No. US 2010-0020170, and/or U.S. patent application Ser. No. 13/534,657, filed Jun. 27, 2012, and published on Jan. 3, 2013 as U.S. Patent Publication No. US 2013-0002873, which are all hereby incorporated herein by reference in their entireties. The camera or cameras may comprise any suitable cameras or imaging sensors or camera modules, and may utilize aspects of the cameras or sensors described in U.S. Publication No. US-2009-0244361, and/or U.S. Pat. Nos. 8,542,451; 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670, 935; 5,760,962; 5,715,093; 5,877,897; 6,922,292; 6,757, 109; 6,717,610; 6,590,719; 6,201,642; 6,498,620; 5,796, 094; 6,097,023; 6,320,176; 6,559,435; 6,831,261; 6,806, 452; 6,396,397; 6,822,563; 6,946,978; 7,339,149; 7,038, 577; 7,004,606; 7,720,580 and/or 7,965,336, and/or International Publication Nos. WO/2009/036176 and/or WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149, and/or U.S. Publication No. US-2006-0061008, and/or U.S. patent application Ser. No. 12/578,732, filed Oct. 14, 2009, now U.S. Pat. No. 9,487,144, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. patent application Ser. No. 13/333,337, filed Dec. 21, 2011, now U.S. Pat. No. 9,264,672, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. Publication Nos. US-2006-0061008 and/or US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and/or 6,124,886, and/or U.S. Publication No. US-2006-0050018, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A camera assembly for a vehicle vision system, said camera assembly comprising:
    a housing comprising a first housing portion mated with a second housing portion;
    wherein said first housing portion comprises a lens holder;
    wherein said second housing portion comprises a connector portion;
    wherein said connector portion is configured for connecting to vehicle wiring when said camera assembly is installed at a vehicle;
    a circuit element disposed within said housing;
    a plurality of electrical connector elements disposed at said connector portion of said second housing portion, wherein each of said electrical connector elements comprises (i) a first end portion that is configured for electrically connecting to circuitry of said circuit element and (ii) a second end portion that is configured for electrically connecting to the vehicle wiring;
    wherein said first end portions of said electrical connector elements comprise flexible elements;
    wherein, during mating of said first housing portion to said second housing portion, said first end portions of said electrical connector elements flex as said first end portions engage said circuitry and make electrical connection with said circuitry; and
    wherein said first end portions have a thickness that is less than a thickness of said second end portions of said electrical connector elements.

2. The camera assembly of claim 1, wherein said first end portions of said electrical connector elements are angled relative to said second end portions of said electrical connector elements.

3. The camera assembly of claim 1, wherein said first end portions of said electrical connector elements comprise spring elements that compress as said first end portions engage said circuitry and make electrical connection with said circuitry during mating of said first housing portion to said second housing portion.

4. The camera assembly of claim 1, wherein said first end portions of said electrical connector elements are biased towards an extended state and compress towards a compressed state as said first end portions engage said circuitry and make electrical connection with said circuitry during mating of said first housing portion to said second housing portion.

5. The camera assembly of claim 4, wherein, when in said compressed state, said first end portions exert a biasing force at said circuitry to maintain electrical connection with said circuitry.

6. The camera assembly of claim 1, wherein said first end portions of said electrical connector elements comprise coil spring elements that compress as said first end portions engage said circuitry and make electrical connection with said circuitry during mating of said first housing portion to said second housing portion.

7. The camera assembly of claim 1, wherein said electrical connector elements are insert molded in said connector portion during injection molding of said second housing portion with a polymer resin.

8. The camera assembly of claim 1, wherein said first end portions of said electrical connector elements engage respective electrically conductive pads at said circuit element during mating of said first housing portion to said second housing portion.

9. The camera assembly of claim 1, wherein each of said electrical connector elements comprises a terminal body that is disposed in said connector portion of said second housing portion, and wherein said first end portion is at a first end of said terminal body, and wherein said second end portion is at a second end of said terminal body.

10. The camera assembly of claim 9, wherein said first end portions are connected to said first ends of said terminal bodies of said electrical connector elements.

11. The camera assembly of claim 10, wherein said first end portions are press-fit at said first ends of said terminal bodies.

12. The camera assembly of claim 11, wherein said second end portions are integrally formed with said terminal bodies.

13. The camera assembly of claim 1, wherein said first end portions are disposed in respective chambers of said second housing portion that are electrically isolated from one another to limit contact between pairs of said first end portions.

14. The camera assembly of claim 1, wherein said camera assembly comprises a rear backup camera of a vehicle.

15. A camera assembly for a vehicle vision system, said camera assembly comprising:
    a housing comprising a first housing portion mated with a second housing portion;
    wherein said first housing portion comprises a lens holder;
    wherein said second housing portion comprises a connector portion;
    wherein said connector portion is configured for connecting to vehicle wiring when said camera assembly is installed at a vehicle;
    a circuit element disposed within said housing;
    a plurality of electrical connector elements disposed at said connector portion of said second housing portion, wherein each of said electrical connector elements comprises (i) a first end portion that is configured for electrically connecting to circuitry of said circuit element and (ii) a second end portion that is configured for electrically connecting to the vehicle wiring;
    wherein each of said electrical connector elements comprises a terminal body that is disposed in said connector portion of said second housing portion, and wherein said first end portion is at a first end of said terminal body, and wherein said second end portion is at a second end of said terminal body;
    wherein said first end portions of said electrical connector elements comprise spring elements, and wherein, during mating of said first housing portion to said second housing portion, said spring elements compress as said first end portions engage said circuitry and make electrical connection with said circuitry;
    wherein said first end portions are biased towards an extended state and compress towards a compressed state as said first end portions engage said circuitry and make electrical connection with said circuitry during mating of said first housing portion to said second housing portion;

wherein, when in said compressed state, said first end portions exert a biasing force at said circuitry to maintain electrical connection with said circuitry; and wherein said first end portions have a thickness that is less than a thickness of said second end portions of said electrical connector elements.

16. The camera assembly of claim 15, wherein said electrical connector elements are insert molded in said connector portion during injection molding of said second housing portion with a polymer resin.

17. The camera assembly of claim 15, wherein said spring elements are disposed in respective chambers of said second housing portion that are electrically isolated from one another to limit contact between pairs of said spring elements.

18. A camera assembly for a vehicle vision system, said camera assembly comprising:

a housing comprising a first housing portion mated with a second housing portion;

wherein said first housing portion comprises a lens holder;

wherein said second housing portion comprises a connector portion;

wherein said connector portion is configured for connecting to vehicle wiring when said camera assembly is installed at a vehicle;

a circuit element disposed within said housing;

a plurality of electrical connector elements disposed at said connector portion of said second housing portion, wherein each of said electrical connector elements comprises (i) a body portion, (ii) a first end portion at a first end of said body portion, wherein said first end portion is configured for electrically connecting to circuitry of said circuit element, and (iii) a second end portion at a second end of said body portion, wherein said second end portion is configured for electrically connecting to the vehicle wiring;

wherein said body portions are insert molded in said connector portion during injection molding of said second housing portion with a polymer resin;

wherein said second end portions are integrally formed with said terminal bodies and are exposed at said connector portion of said second housing portion;

wherein said first end portions of said electrical connector elements comprise flexible elements;

wherein, during mating of said first housing portion to said second housing portion, said first end portions of said electrical connector elements flex as said first end portions engage said circuitry and make electrical connection with said circuitry;

wherein said first end portions are of said electrical connector elements are biased towards a non-flexed state and flex towards a flexed state as said first end portions engage said circuitry and make electrical connection with said circuitry during mating of said first housing portion to said second housing portion; and wherein said first end portions have a thickness that is less than a thickness of said second end portions of said electrical connector elements.

19. The camera assembly of claim 18, wherein said first end portions of said electrical connector elements comprise spring elements that compress as said first end portions engage said circuitry and make electrical connection with said circuitry during mating of said first housing portion to said second housing portion, and wherein, when in said compressed state, said first end portions exert a biasing force at said circuitry to maintain electrical connection with said circuitry, and wherein said spring elements are disposed in respective chambers of said second housing portion that are electrically isolated from one another to limit contact between pairs of said spring elements.

* * * * *

UNITED STATES PATENT AND TRADEMARK OFFICE
CERTIFICATE OF CORRECTION

PATENT NO. : 10,875,469 B2
APPLICATION NO. : 14/665065
DATED : December 29, 2020
INVENTOR(S) : Jamie A. Mleczko et al.

Page 1 of 1

It is certified that error appears in the above-identified patent and that said Letters Patent is hereby corrected as shown below:

In the Claims

<u>Column 12</u>
Claim 18, Line 7, "with said terminal" should be --with terminal--

Signed and Sealed this
Second Day of February, 2021

Drew Hirshfeld
*Performing the Functions and Duties of the
Under Secretary of Commerce for Intellectual Property and
Director of the United States Patent and Trademark Office*